United States Patent [19]
Houlihan et al.

[11] 3,859,356
[45] Jan. 7, 1975

[54] BENZYLIDENE SUBSTITUTED BICYCLIC AND TRICYCLIC COMPOUNDS

[75] Inventors: William J. Houlihan, Mountain Lakes; Jeffrey Nadelson, Lake Parsippany, both of N.J.

[73] Assignee: Sandor-Wander, Inc., Hanover, N.J.

[22] Filed: July 24, 1972

[21] Appl. No.: 274,310

[52] U.S. Cl....... 260/570.9, 260/501.1, 260/501.21, 424/316, 424/330
[51] Int. Cl............................................. C07c 87/28
[58] Field of Search.......... 260/570.9, 501.1, 501.2; 424/330

[56] References Cited
UNITED STATES PATENTS
3,787,495  1/1974  Houlihan et al. ............ 260/570.5 R Primary Examiner—Robert V. Hines
Attorney, Agent, or Firm—Gerald D. Sharkin; Robert S. Honor

[57] ABSTRACT

Substituted dimethyl aminomethyl benzylidene bicyclic and tricyclic compounds, e.g., 5-(o-dimethylaminomethylbenzylidene)-10,11-dihydro-5H-dibenzo[a,d]cycloheptene, are prepared by treating a substituted dimethylamino benzyl lithium compound with bicyclic and tricyclic ketones and are useful as major tranquilizers and muscle relaxants.

4 Claims, No Drawings

BENZYLIDENE SUBSTITUTED BICYCLIC AND TRICYCLIC COMPOUNDS

This invention relates to bicyclic and tricyclic compounds. In particular, it relates to bicyclic and tricyclic compounds and acid addition salts thereof substituted with dimethylaminomethylbenzylidene moieties, processes for their preparation and their use in pharmaceutical compositions.

The compounds of this invention may be represented by the following structural formula:

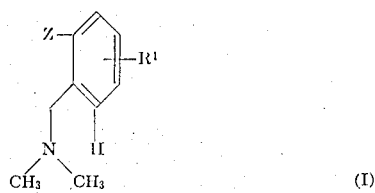

(I)

where
$R^1$ is hydrogen, halo having an atomic weight of between about 19 to 36, straight chain lower alkyl, i.e., straight chain alkyl having one to four carbon atoms, e.g., methyl ethyl, propyl and the like, straight chain lower alkoxy, i.e., straight chain alkoxy having one to four carbon atoms, e.g., methoxy, ethoxy, propoxy and the like or trifluoromethyl and
Z is

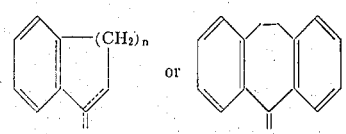

where $n$ is 1, 2 or 3,
and pharmaceutically acceptable acid addition salts thereof.

The compounds of formula (I) may also be represented by the following structures:

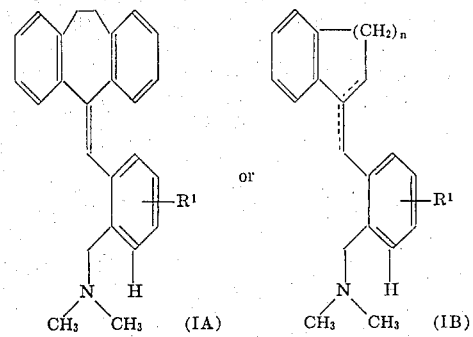

where $R^1$ and $n$ are as set out above.

For the purposes of the specification and claims, the dotted line in the compounds of formula (IB) indicates that the compound can be isolated in two tautomeric forms. It will be understood that the double bond within and outside the ring are within the scope of this invention.

The compounds of formula (IA) are prepared in accordance with the following reaction scheme:

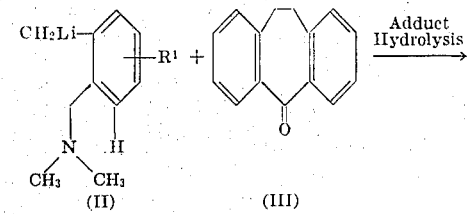

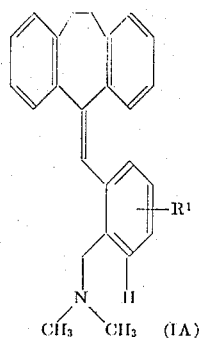

(IA)

where $R^1$ is as set out above.

The compounds of formula (IA) are prepared by treating a compound of formula (II) with a compound of formula (III) in an inert solvent such as diethyl ether, tetrahydrofuran, hexane, heptane or the like, in the presence of an inert gas, e.g., nitrogen, helium or argon and subjecting the resulting mixture to hydrolysis, preferrably with aqueous ammonium chloride. The temperature of the reaction is not critical but it is preferred that the process be carried out at temperatures between about −10° to 10° C., especially −5° to 5° C. For optimum results the reaction is run for about 30 minutes to 2 hours; preferably 45 to 75 minutes. The particular solvent used in the preparation and the reaction time are not critical.

The compounds of formula (IA) may be recovered using conventional recovery techniques such as crystallization.

The compounds of formula (IB) are prepared in accordance with the following reaction scheme:

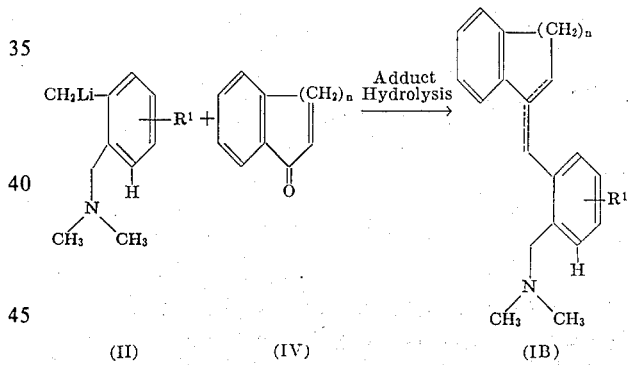

where $R^1$ and $n$ are as set out above.

The compounds of formula (IB) are prepared by treating a compound of formula (II) with a compound of formula (IV) under the same reaction conditions as in the preparation of the compound of formula (IA).

The compounds of formula (II) are prepared in accordance with the following reaction scheme:

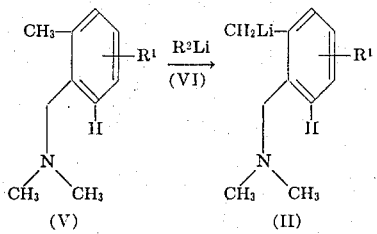

where
$R^1$ is as set out above, and
$R^2$ is alkyl having one to eight carbon atoms.

The compounds of formula (II) are prepared by treating a compound of formula (V) with an alkyl lithium compound (VI) in a solvent in the presence of an inert gas. The preferred alkyl lithium compound is n-butyl lithium. The preferred solvent may be lower hydrocarbons such as pentane, hexane, heptane and the like, ethers such as diethyl ether, dibutyl ether, and the like, or tetrahydrofuran. The inert gas may be nitrogen, helium, argon, and the like. The temperature of the reaction is not critical but it is preferred that the process be carried out at temperatures between about 15° to 50° C., especially 20° to 30° C. For optimum results the reaction is run for about 12 to 24 hours; preferably 16 to 20 hours. The particular solvent used and the reaction time are not critical. The product is not usually isolated, but is normally used in the solvent in which it is prepared.

Compounds (III), (IV) and (VI) and certain of the compounds of formula (V) are known and may be prepared according to methods disclosed in the literature. Those compounds of formula (V) not specifically disclosed are prepared by analogous methods from known starting materials.

The compound of formula (I) exists in racemic form or in the form of optically active isomers. The separation and recovery of the respective isomers may be readily accomplished employing conventional techniques, and such isomers are included within the scope of the invention.

The compounds of formula (IA) and (IB), are useful because they possess pharmacological activity in animals. In particular, the compounds are useful as both major tranquilizers and muscle relaxants as indicated (1) by their ability to produce docility in behavior tests in mice given 82.3 to 200 mg/kg of test compound according to the 30 word adjective check sheet system basically as described by Irwin, S. (Gordon Research Conference, Medicinal Chemistry, 1959) and Chen (Symposium on Sedative and Hypnotic Drugs, Williams and Wilkins, 1954); (2) by measuring the locomotor activity of mice given 9.3 to 50 mg/kg i.p. of the test compound in interaction with 2.5 mg/kg i.p. of amphetamine sulfate. The locomotor activity is measured over an 80 minute period with the aid of an actophotometer; (3) by the hexobarbital reinduction method of Winter et al. (J. Pharmacol. Exp. Therap., 94: 7–11, 1948) in mice given 42.1 mg/kg i.p. of test compound and (4) by the rotorod method described by Dunham and Miya (J. Am. Pharm. Assoc. 45: 208, 1957) in mice given 31.6 to 64.1 mg/kg i.p. of test compound.

For such use, the compounds (IA) and (IB) may be combined with a pharmaceutically acceptable carrier or adjuvant, and may be administered orally in such forms as tablets, elixers, suspensions and the like, or parenterally in the form of an injectable solution or suspension. The dosage will vary depending upon the mode of administration utilized and the particular compound employed.

The compounds of formula (IA) and (IB) may be similarly administered in the form of their non-toxic pharmaceutically acceptable acid addition salts. Such salts possess the same order of activity as the free base, and are readily prepared by reacting the base with an appropriate acid and accordingly are included within the scope of this invention. Representative of such salts are the mineral acid salts, such as the hydrochloride, sulfate and the like and the organic acid salts, such as the acetate, p-toluenesulfonate, maleate and the like.

As noted above, the compounds of formula (I) exist as optical isomers. In some cases, greater pharmacological activity or other beneficial attribute may be found for a particular isomer and in such cases administration of such isomer may be preferred.

In general, satisfactory results are obtained in the treatment of psychoses and muscular spasms when the compounds are administered at a daily dosage of from about 2 milligrams to 300 milligrams per kilogram of animal body weight. This daily dosage is preferably given in divided doses, e.g., two to four times a day, or in sustained release form. For most large mammals, the total daily dosage is from about 150 to 2,000 milligrams, and dosage forms suitable for internal administration comprise from about 37.5 milligrams to about 1,000 milligrams of the compound in admixture with a solid or liquid pharmaceutical carrier or diluent.

A representative formulation suitable for oral administration 2 to 4 times a day for the treatment of psychoses or muscular spasms is a capsule prepared by standard encapsulating techniques which contains the following:

| Ingredients | Weight (mg) |
| --- | --- |
| 5-(o-dimethylaminomethylbenzylidene)-10,11-dihydro-5H-dibenzo[a,d]cycloheptene | 100 |
| Inert solid diluent (starch, lactose, kaolin) | 200 |

EXAMPLE 1

5-(o-dimethylaminomethylbenzylidene)-10,11-dihydro-5H-dibenzo[a,d]cycloheptene hydrochloride To a flask equipped with a stirrer, dropping funnel, condenser and gas inlet tube maintained under a nitrogen atmosphere there is added at room temperature 11.2 g. (0.075 mole) of N,N-dimethyl-o-methylbenzylamine in 100 ml. of dry ether. Stirring is initiated and 52.2 ml. of n-butyl lithium (0.083 mole) in hexane is added dropwise for about 20 minutes. The resulting dimethylaminomethylbenzyl lithium compound is stirred at room temperature for about 18 hours, and then cooled to an internal temperature of 0° C. Stirring is initiated and a solution of 17.3 g. (0.083 mole) of 10-,11-dihydro-5H-dibenzo[a,d]cycloheptene-5-one in 50 ml. of diethyl ether is added dropwise for 30 minutes. Stirring is continued at 0° C. for an additional 30 minutes and the resulting adduct is treated with 100 ml. of saturated ammonium chloride solution. The layers are separated and the diethyl ether layer is dried over anhydrous magnesium sulfate, filtered and evaporated in vacuo. The resulting product is redissolved in ether and treated with hydrogen chloride gas to give 5-(o-dimethylaminomethylbenzylidene)-10,11-dihydro-5H-dibenzo [a,d]cycloheptene hydrochloride; m.p. 220–222° C.

Following the above procedure and using in place of the o-methyl-N,N-dimethylbenzylamine an equivalent amount of a. 4-chloro-2-methyl-N,N-dimethylbenzylamine,
b. 4-methoxy-2-methyl-N,N-dimethylbenzylamine,
c. 4,5-dimethyl-N,N-dimethylbenzylamine,
d. 2-methyl-4-trifluoromethyl-N,N-dimethylbenzylamine, there is obtained a. 10,11-dihydro-5-(4-chloro-2-dimethylaminomethylbenzylidene)-5H-dibenzo[a,d]cycloheptene hydrochloride, b. 10,11-dihydro-5-(4-methoxy-2-dimethylaminomethylbenzylidene)-5H-dibenzo[a,d]cycloheptene hydrochloride, c. 10,11-dihydro-5-(4-methyl-2-dimethylaminomethylbenzylidene)-5H-dibenzo[a,d]cycloheptene hydrochloride, or d. 10,11-dihydro-5-(4-trifluoromethyl-2-dimethylaminomethylbenzylidene)-5H-dibenzo[a,d]cycloheptene hydrochloride, respectively.

The 10,11-dihydro-5-(o-dimethylaminomethylbenzylidene)-5H-dibenzo[a,d]cycloheptene hydrochloride of this example is an effective major tranquilizer and muscle relaxant when orally administered to an animal suffering from psychoses or muscular spasms at a dosage of 100 milligrams four times per day.

EXAMPLE 2

Following the detailed procedure of Example 1 and using in place of the 10,11-dihydro-5H-dibenzo[a,d]cycloheptene-5-one an equivalent amount of a. 1-indanone, b. α-tetralone, c. 5-benzocycloheptanone there is obtained a. 3-(2-dimethylaminomethylbenzyl)-1-indene hydrochloride m.p. 191°–192° C., b. 1-(2-dimethylaminomethylbenzyl)-3,4-dihydronaphthalene hydrochloride; m.p. 192°–193° C., or c. 9-(2-dimethylaminomethylbenzyl)-6,7-dihydro-5H-benzocycloheptene hydrochloride; m.p. 199.5°–203° C, respectively.

What is claimed is:

1. The compound which is 5-(o-dimethylaminomethyl-benzylidene)-10,11-dihydro-5H-dibenzo[a,d]cycloheptene.

2. The compound which is 3-(2-dimethylaminomethylbenzyl)indene.

3. The compound which is 1-(2-dimethylaminomethylbenzyl)-3,4-dihydronapthalene.

4. The compound which is 9-(2-dimethylaminomethylbenzyl)-6,7-dihydro-5H-benzocycloheptene.

* * * * *